US011226743B2

(12) United States Patent
Tomkins et al.

(10) Patent No.: US 11,226,743 B2
(45) Date of Patent: Jan. 18, 2022

(54) PREDICTING AND PREVENTING EVENTS IN A STORAGE SYSTEM USING COPY SERVICES

(71) Applicant: International Business Machines Corporation, Armonk, NY (US)

(72) Inventors: Dominic Tomkins, Hook (GB); Miles Mulholland, Eastleigh (GB); Eric John Bartlett, Chard (GB); Alex Dicks, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/556,307

(22) Filed: Aug. 30, 2019

(65) Prior Publication Data

US 2021/0064247 A1    Mar. 4, 2021

(51) Int. Cl.
*G06F 3/06* (2006.01)
*G06F 9/50* (2006.01)

(52) U.S. Cl.
CPC ............ *G06F 3/0614* (2013.01); *G06F 3/067* (2013.01); *G06F 3/0643* (2013.01); *G06F 3/0673* (2013.01); *G06F 9/5083* (2013.01)

(58) Field of Classification Search
CPC .... G06F 3/0614; G06F 3/0619; G06F 3/0643; G06F 3/067; G06F 9/5083
USPC ........................................................ 711/154
See application file for complete search history.

(56) References Cited

U.S. PATENT DOCUMENTS

| 5,652,863 | A  | * | 7/1997  | Asensio .............. G06F 3/04847 711/173 |
| 6,530,035 | B1 |   | 3/2003  | Bridge |
| 7,676,702 | B2 |   | 3/2010  | Basham et al. |
| 7,680,991 | B2 |   | 3/2010  | Chodacki et al. |
| 8,341,376 | B1 | * | 12/2012 | Blackwell ............... G06F 3/067 711/170 |
| 2003/0126309 | A1 | * | 7/2003  | Camble .................. G06F 21/78 719/321 |
| 2008/0126857 | A1 | * | 5/2008  | Basham .............. G06F 11/3466 714/25 |
| 2008/0184063 | A1 | * | 7/2008  | Abdulvahid ........ G06F 11/1471 714/6.3 |
| 2012/0143873 | A1 | * | 6/2012  | Saadat ................ G06F 16/2228 707/741 |
| 2013/0036326 | A1 | * | 2/2013  | Blea ..................... G06F 11/2069 714/6.3 |
| 2016/0011811 | A1 |   | 1/2016  | Garson et al. |
| 2016/0139835 | A1 | * | 5/2016  | Fiebrich-Kandler ....................... G06F 3/0608 711/114 |

(Continued)

OTHER PUBLICATIONS

Mell et al., "The NIST Definition of Cloud Computing", NIST Special Publication 800-145, Sep. 2011, 7 pages.

*Primary Examiner* — Than Nguyen
(74) *Attorney, Agent, or Firm* — Alexander G. Jochym

(57) ABSTRACT

Method and system are provided for managing capacity in a storage system using copy services. The method is a computer-implemented method that predicts an imminent event due to a constrained resource and identifies one or more copy service relationship that will mitigate the imminent event. The method orchestrates a partial or full invalidation of a copy service relationship to reclaim some of the constrained resource to prevent the imminent event, including updating the copy service relationship metadata to indicate the invalidation.

18 Claims, 6 Drawing Sheets

(56) References Cited

U.S. PATENT DOCUMENTS

2016/0232102 A1* 8/2016 Ash ..................... G06F 12/126
2019/0018595 A1 1/2019 Gupta et al.

* cited by examiner

PREDICTING AND PREVENTING EVENTS IN A STORAGE SYSTEM USING COPY SERVICES

BACKGROUND

The present invention relates to storage systems, and more specifically, to managing capacity in a storage system using copy services.

Copy services are a collection of features which allow storage systems to have, amongst other things, disaster recovery integrated into the Input/Output path. Virtual storage systems may feature multiple layers of copy services such as volume mirroring and remote copy. Such copy services maintain ongoing copies of the source data.

SUMMARY

According to an aspect of the present invention there is provided a computer-implemented method for managing capacity in a storage system using copy services, comprising: predicting an imminent event due to a constrained resource; identifying one or more copy service relationship that will mitigate the imminent event; orchestrating a partial or full invalidation of a copy service relationship to reclaim some of the constrained resource to prevent the imminent event, wherein the invalidation includes updating the copy service relationship metadata to indicate the invalidation.

According to another aspect of the present invention there is provided a system for managing capacity in a storage system using copy services, comprising: a processor and a memory configured to provide computer program instructions to the processor to execute the function of the component: an event prediction component for predicting an imminent event due to a constrained resource; a copy service relationship component for identifying one or more copy service relationship that will mitigate the imminent event; an invalidation component for orchestrating a partial or full invalidation of a copy service relationship to reclaim some of the constrained resource to prevent the imminent event, wherein the invalidation component includes a metadata updating component for updating the copy service relationship metadata to indicate the invalidation.

According to a further aspect of the present invention there is provided a computer program product for managing capacity in a storage system using copy services, the computer program product comprising a computer readable storage medium having program instructions embodied therewith, the program instructions executable by a processor to cause the processor to: predict an imminent event due to a constrained resource; identify one or more copy service relationship that will mitigate the imminent event; orchestrate a partial or full invalidation of a copy service relationship to reclaim some of the constrained resource to prevent the imminent event, wherein the invalidation includes updating the copy service relationship metadata to indicate the invalidation. The computer readable storage medium to be a non-transitory computer readable storage medium and for the computer readable program code to be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system provide capacity management for storage systems that use copy services. The capacity management uses copy service space resources to trade redundancy for storage capacity using automatic dumping of data copies for fast storage capacity reclamation.

Exhaustions of constrained system resources often cause customer-impacting events. One common example of this would be a system running out of physical space in a thin-provisioned environment. Currently, a physical out of space scenario in a system may result in a pool being taken offline with synchronization loss between copies. A customer would lose complete access to the pool.

The management may involve partial suspension of a copy services relationship in order to minimize the impact upon users while maximizing relief of constrained resources in such a way that they can be recovered.

Figure 1:
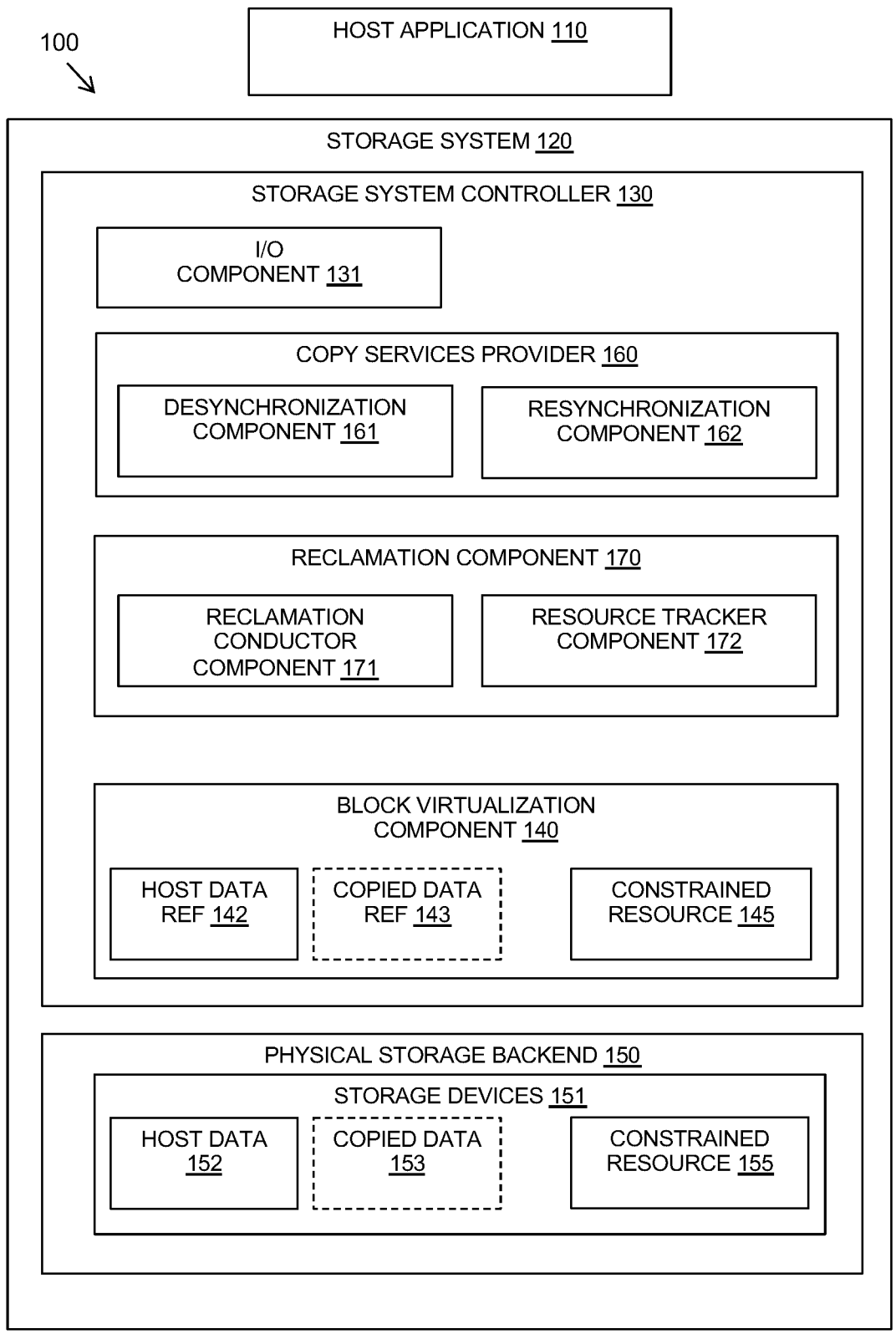
FIG. 1 is a block diagram of a storage system in which the present invention may be implemented.

Referring to FIG. 1, a block diagram 100 shows an example storage system 120 in which the described capacity management may be implemented. Storage systems 120 may take many different forms and the described capacity management may be applied in any storage system that includes copy services as described further below.

The storage system 120 provides storage for host applications 110 having storage interfaces through which I/O operations are handled for writing and reading data to and from the storage system 120.

The storage system 120 includes a storage system controller 130 and a physical storage backend 150. The physical storage backend 150 provides physical disk storage across an array of physical storage devices 151 of non-volatile storage media. The physical storage backend 150 has physical addresses at which logical units of host data are stored.

In a storage system 120 using virtualized storage management, the storage system controller 130 may provide a block virtualization component 140 for maintaining a virtual domain in which logical metadata is maintained of logical block addresses (LBAs) which are mapped to references of physical addresses at which the host data is stored at the physical storage backend 150.

Thin provisioning may be provided in a storage system 120 using the block virtualization to give the appearance of having more physical storage resources than are actually provided.

The storage system controller 130 may include an Input/Output component 131 for receiving and responding to host application 110 storage read and writes of host data.

The described storage system controller 130 may include one or more copy service providers 160. The copy services providers 160 may be services that provide redundancy by copying data for storage and providing duplicate data referencing addresses. For example, host data references 142 may be copied data references 143 at the block virtualization component 140 and/or host data 152 may be copied data 153 at the physical storage backend 150. Various different copy service techniques are known, such as Volume Mirroring, Flash Copy or a Global Mirror with Change Volumes (GMCV).

The described storage system controller 130 may include a reclamation component 170 for managing reclamation of constrained resources by partial or full invalidation of a copy service relationship provided by a copy service provider 160, such as by removing copy service mappings. A partial invalidation of a maintained copy may invalidate only a select region of that copy.

The reclamation component 170 may include a reclamation conductor component 171 and a resource tracker component 172.

The reclamation conductor component 171 initiates and conducts resource reclamation actions across the storage system 120. The resources in question may for example be free physical capacity, free capacity of a particular tier, or free logical capacity. Such resources may be constrained during operation of the storage system 120, for example, as constrained resources 155 in the physical storage backend 150 or constrained resources 145 in the block virtualization component 140.

Copy services typically operate in the virtual domain and using the described method and system, copy service mappings are removed to partially or fully invalidate the copy service in order to reclaim constrained resources, which may be virtual constrained resources 145 or physical constrained resources 155, or other constrained resources as described below including inter-site copy services bandwidth, garbage collection bandwidth, or copy progress tracking memory resources.

One example of a copy service is volume mirroring in which one takes a given block device (a volume), and stores two copies in different pools on a given storage system controller. This is distinct from remote copy, which typically involves mirroring incoming writes to a partner storage controller in the case of inter-cluster remote copy.

When a volume is mirror, such that it is present in two pools in the same system, it has the associated virtual capacity in use. It also has a physical capacity overhead which may be distinct from this virtual size if a technology such as thin provisioning is in use. Similarly, the local copy of a remotely mirrored volume has overheads in the virtual and physical domains depending on the implementation. The reclamation conductor component 171 tracks and manipulates the resource capacity in use in order to free up constrained resources.

The reclamation conductor component 171 may track various details for each copy services provider 160, such as whether or not the user permits a desynchronization of the copy service relationship and the invalidation of target data. In addition to this, the reclamation conductor component 171 has awareness of shared resources and awareness of the consumption of resources for the copy relationships via the resource tracker component 172.

Each copy services provider 160 in a storage system 120 implementing the described system includes a desynchronization component 161 available to desynchronize partial or full copy service relationships, for example, by removing copy service mappings. For some copy services eventual resynchronization will restore the relationship and a resynchronization component 162 may be provided, for others resynchronization will not be possible and this is a lossy act.

Figure 2:
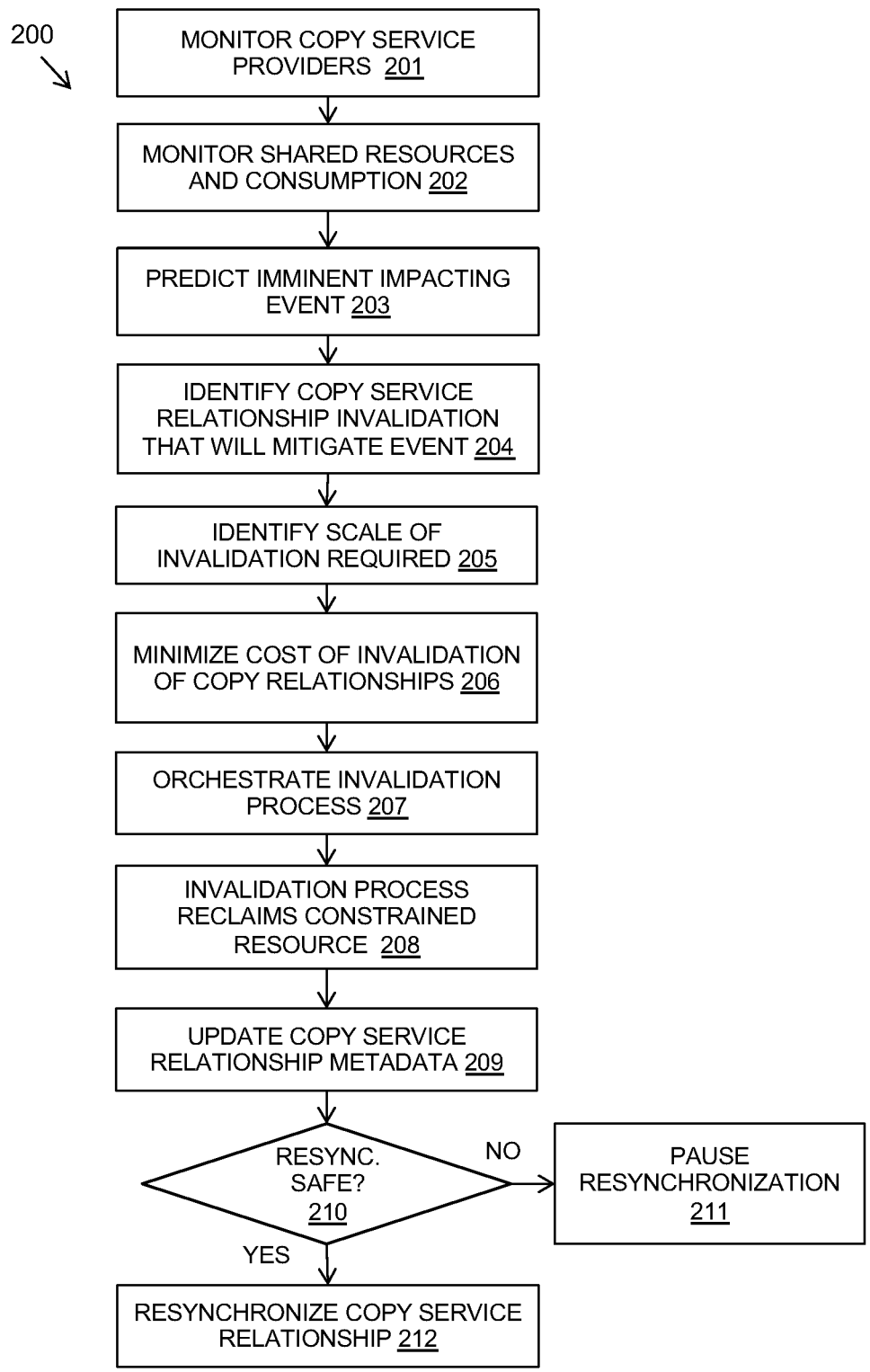
FIG. 2 is a flow diagram of an example embodiment of a method in accordance with the present invention.

Referring to FIG. 2, a flow diagram 200 shows an example embodiment of the described method carried out by a reclamation component 170 of a storage system controller 130.

In step 201, the method may monitor copy service providers including any permissions and/or prioritizations for invalidation of their copy service relationships. Permissions and/or prioritizations may be configured for users of a copy service provider. For example, users may have different priorities for maintaining their copies; a user may prefer to lose synchronization progress in a low priority copy in a trade-off for maintaining access to their critical volumes in the pool.

In step 202, the method may monitor shared resources and an awareness of the consumption of resources for the copy relationships.

In step 203, the method may predict that the storage system is in danger of an imminent undesired event such as a customer impacting event. For example, an undesired event may be a pool running out of physical space or a performance event due to tier imbalance.

In step 204, the method may identify copy service relationships of one or more copy service providers of which an invalidation action will mitigate the predicted event. Additionally, in step 205 the method may identify the scale of the required invalidation action appropriate for the event. The method may understand the system costs of desynchronization for each copy relationship and may attempt to minimize, in step 206, the cost of its actions for the most benefit to the system. Sub-object ranges may be selected using rules in order to achieve an action that meets these criteria.

In step 207, the method then orchestrates the invalidation process including partial or full invalidation of a copy service relationship. In step 208, the invalidation process carries out a reclamation of some of the underlying constrained resource and in step 209 updates the copy services relationship metadata in order for the invalidated data to be marked as stale and require resynchronizing in the future.

In step 210, the method may determine if resynchronization is safe, for example, if there is enough previously constrained resource to resynchronize the copy service relationship. If it is not safe, resynchronization may be paused or not carried out in step 211. If it is safe, resynchronization of the copy service relationship may be carried out in step 212. For example, if the resource is severely constrained and resynchronizing will consume resources which in turn may trigger a customer impacting event, the reclamation conductor can prevent resynchronization.

This provides a method of dynamically freeing up the space of a storage pool that has run out of capacity. Space is recovered by deallocating selected parts of any mirrored or copied volumes within the pool which means that only the deallocated selected data may need to be recovered via a resynchronization when the out of space condition is resolved.

In an example embodiment below, a storage system has a thin-provisioned physical storage backend that is close to running out of space. In this case a reclamation component un-maps space from copy services' target volumes in order to quickly recover physical capacity. If resynchronization would then consume enough physical space to drive the backend out of physical space, then the reclamation conductor would pause resynchronization.

In the example embodiment a copy service provider provides volume mirroring in a storage system, which utilizes bitmaps in order to maintain multiple synchronized volume copies. An invalidation action by the reclamation component on the volume copy associated with a constrained resource may carry out the following steps.

The reclamation component in this embodiment identifies that the storage system is approaching a resource constraint in the form of a managed disk overallocation, with no or insufficient physical capacity free.

Volumes are identified that are consuming this resource in the form of volume copies and LBA ranges that are using the managed disk in question.

Volumes are identified that are suitable for the invalidation action in the form of volume copies where an invalidation action will not result in loss of data.

Invalidation action requirements are then identified in the form of how much physical capacity needs to be reclaimed for the exhaustion of physical space to be prevented.

Candidate volume copies are selected for invalidation action based upon the following aims: to attempt to meet the invalidation action requirements based upon the volume copies identified; to balance the invalidation action across the identified volume copies; to minimize resynchronization cost given the current volume resynchronization rate and how out of synchronization a volume is currently; and to prioritize already out of synchronization copies as invalidation candidates in order to avoid mass desynchronization.

The copy metadata is then updated with the invalidated regions by updating volume mirroring bitmaps so that the copy becomes stale and the invalidated regions require future resynchronization.

The constrained resource is reclaimed by un-mapping volume copy LBA ranges to reclaim physical capacity.

This example is lossless, with the trade-off of loss of synchronization resulting in a loss of redundancy for the duration of the synchronization loss.

Conventionally, a physical out of space scenario in a system would result in synchronization loss between copies as the pool would be taken offline. The described method loses synchronization progress of a single copy in comparison to complete access loss of the pool.

Another example embodiment is a copy service in the form of remote copy, which also utilizes bitmaps in order to maintain remote copy relationships. This example is similar to the above volume mirroring embodiment, except the communication of the invalidated regions must be communicated to the source via the copy relationship if this is an inter-cluster relationship.

Constrained resources that may lead to an undesirable event such as a customer impacting event include the following. Physical capacity—A system that includes compressed or thin-provisioned backend has the limited resource of physical capacity. This is the amount of writable capacity remaining on the backend. Tier capacity—A system with multiple tiers can experience performance problems when high performing tiers are overloaded. Virtual capacity—A system with a limited addressable logical capacity can run out, causing features that require the ability to expand logical addressable capacity of a volume to fail. Inter-site copy services bandwidth—A system with inter-site copy services may experience bandwidth issues, this could lead to a poor performing copy relationship. Garbage collection bandwidth—A system using garbage collection may be under stress and unable to collect at a rate required to avoid running out of space. Copy progress tracking memory resources—A system using copy services has a limited memory available.

Resolution of undesirable events may require a subset of reclamation actions (for example, a partial invalidation, a stopping of resynchronization, etc.) to resolve the event depending on which resources are at risk. For example, if only a particular storage tier is constrained, the ranges of the copy that correspond to the constrained tier may be constrained, but there is no need to prevent resynchronization as the resynchronization can select non-constrained tiers.

Some of these resources require deallocation of the physical storage in order to prevent a customer impacting event, in these cases thin-provisioning can be used to ensure allocation on resynchronization. Allocation of resource on write allows resynchronization writes to provision from a different resource. For example, managed disk 0 is nearly out of physical capacity, so a range from managed disk 0 is deallocated and on resynchronization an allocation preference is made to another managed disk which is not so constrained.

The described techniques hold several advantages over traditional resource recovery techniques, including the following. The described reclamation of constrained resources is far quicker than traditional migration of data. The described method ensures data access to the non-invalidated ranges is maintained, which is an improvement on deleting the copy. The described method is efficient as it requires no additional work compared to traditional migration of data. The described method attempts to prevent a customer impacting event before it occurs without user intervention at the point of action. The described method only desynchronizes the minimal required amount to avoid a customer impacting event. This is contrasted to volume copy deletion with complete loss of the copy. The described method only involves a loss of a copy compared to loss of access to the pool.

The cost of this mechanism is that some redundancy is lost, and resynchronization will be required to regain redundancy; however, this is an improvement over losing access to the copy and requiring user intervention. Conventional technologies only exist for a user to delete a copy entirely or to split the copy into another volume.

The described approach provides mechanisms that allow immediate reclamation of system constrained resources, such as block storage capacity. This is achieved in a fashion that requires no user interaction, no loss of access to production volumes and allows for the system to quickly react to situations that may otherwise result in a customer-impacting event.

Scenarios where this mechanism will have advantageous effect are configurations where customers have different priorities for maintaining their copies, a customer may prefer to lose synchronization progress in a low priority copy in a trade-off for maintaining access to their critical volumes in the pool.

Another example implementation is for disaster recovery testing or application testing, where copies are often taken for this purpose. In these scenarios a customer would not want their testing to impact the availability of their production volumes.

Figure 3:
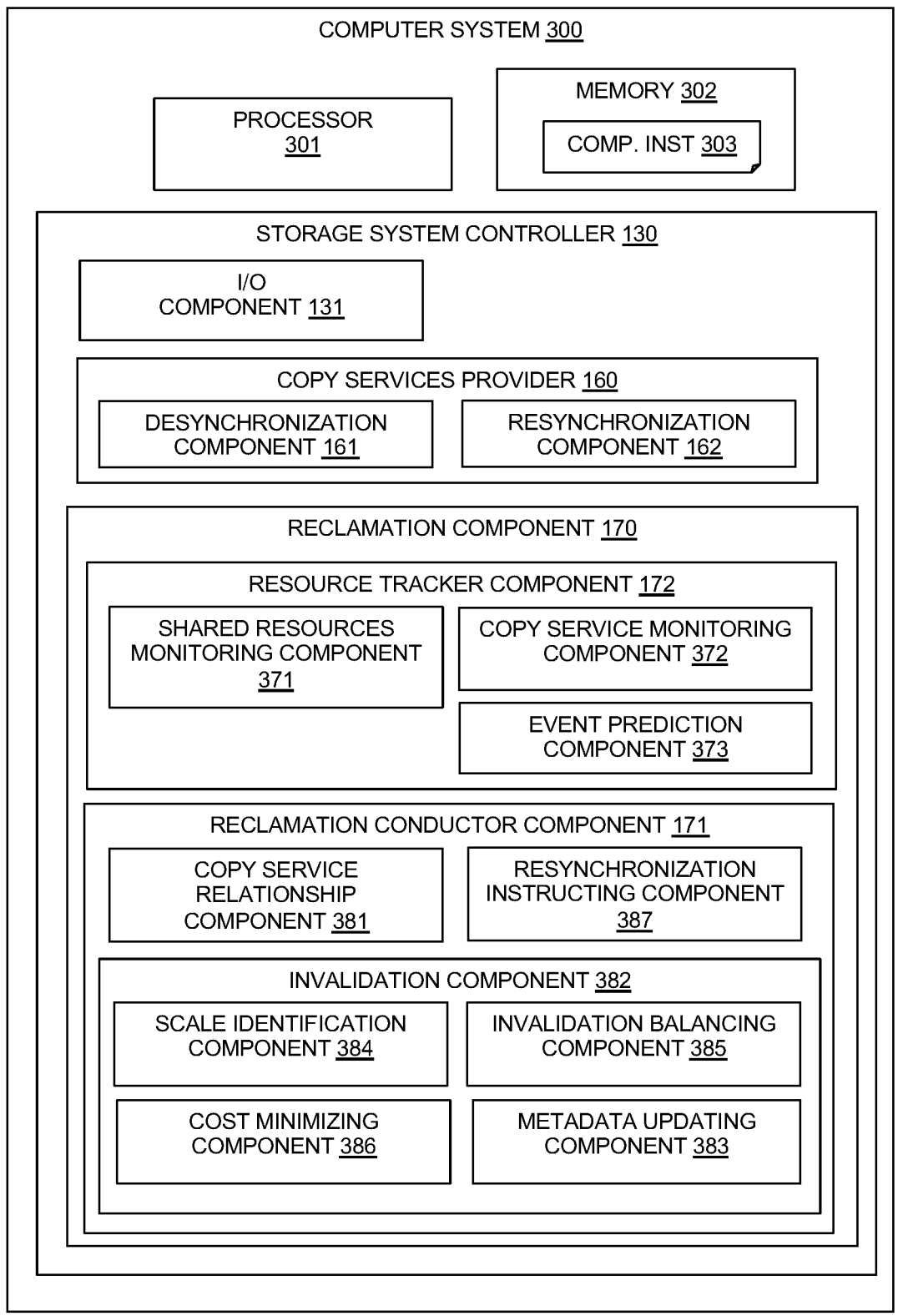
FIG. 3 is a block diagram of an example embodiment of a system in accordance with the present invention.

Referring to FIG. 3, a block diagram shows a computer system 300 of a storage system 120 providing a storage system controller 130 in which an example embodiment of the described system may be implemented.

The computer system 300 includes at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

As described in relation to FIG. 1, a storage system controller 130 may include conventional components such as an Input/Output component 131 for handling read and write operations from host applications to the storage system. The storage system controller 130 may include one or more copy service providers 160 that provide redundancy by copying data for storage or providing duplicate data referencing addresses.

A described reclamation component 170 at the storage system controller 130 may manage storage capacity of potentially constrained resources and may include a reclamation conductor component 171 and a resource tracker component 172.

The resource tracker component 172 may include a copy service monitoring component 372 for monitoring copy service providers including permissions and/or prioritizations for invalidation of their copy service relationships and a shared resources monitoring component 371 for monitoring shared resources and their consumption by copy service providers for their copy service relationships. The resource tracker component 172 may include an event prediction component 373 for predicting an imminent event due to a constrained resource based on the copy service monitoring and the shared resource monitoring.

The reclamation conductor component 171 may include a copy service relationship component 381 for identifying one or more copy service relationships that will mitigate an imminent event determined by the event prediction component 373 and an invalidation component 382 for orchestrating an invalidation of a copy service relationship to reclaim some of the constrained resource to prevent the imminent event. The invalidation component 382 may instruct desynchronizing of a copy service relationship for selected addresses by a copy service provider 160.

A copy service provider 160 may include a desynchronizing component 161 for desynchronizing selected addresses of the copy service and a resynchronizing component 162 for resynchronizing the selected addresses of the copy service.

The invalidation component 382 may include one or more of: a scale identifying component 384 for identifying a scale of the invalidation of a copy service relationship required to mitigate the imminent event and applying the scale to the orchestration of the invalidation; an invalidation balancing component 385 for balancing the invalidation across the identified one or more copy service relationships and prioritizing already invalidated copy service relationships; and a cost minimizing component 386 for minimizing a cost of a resynchronization of a copy service relationship of the identified one or more copy service relationships given a current status and a resynchronization rate.

The invalidation component 382 may include a metadata updating component 383 for updating the copy service relationship metadata to indicate the invalidation.

The reclamation conductor component 171 may also include a resynchronization instructing component 387 for instructing resynchronization of the copy service relationship when the constrained resource has sufficient capacity and if a copy service provider 160 allows resynchronization.

Figure 4:
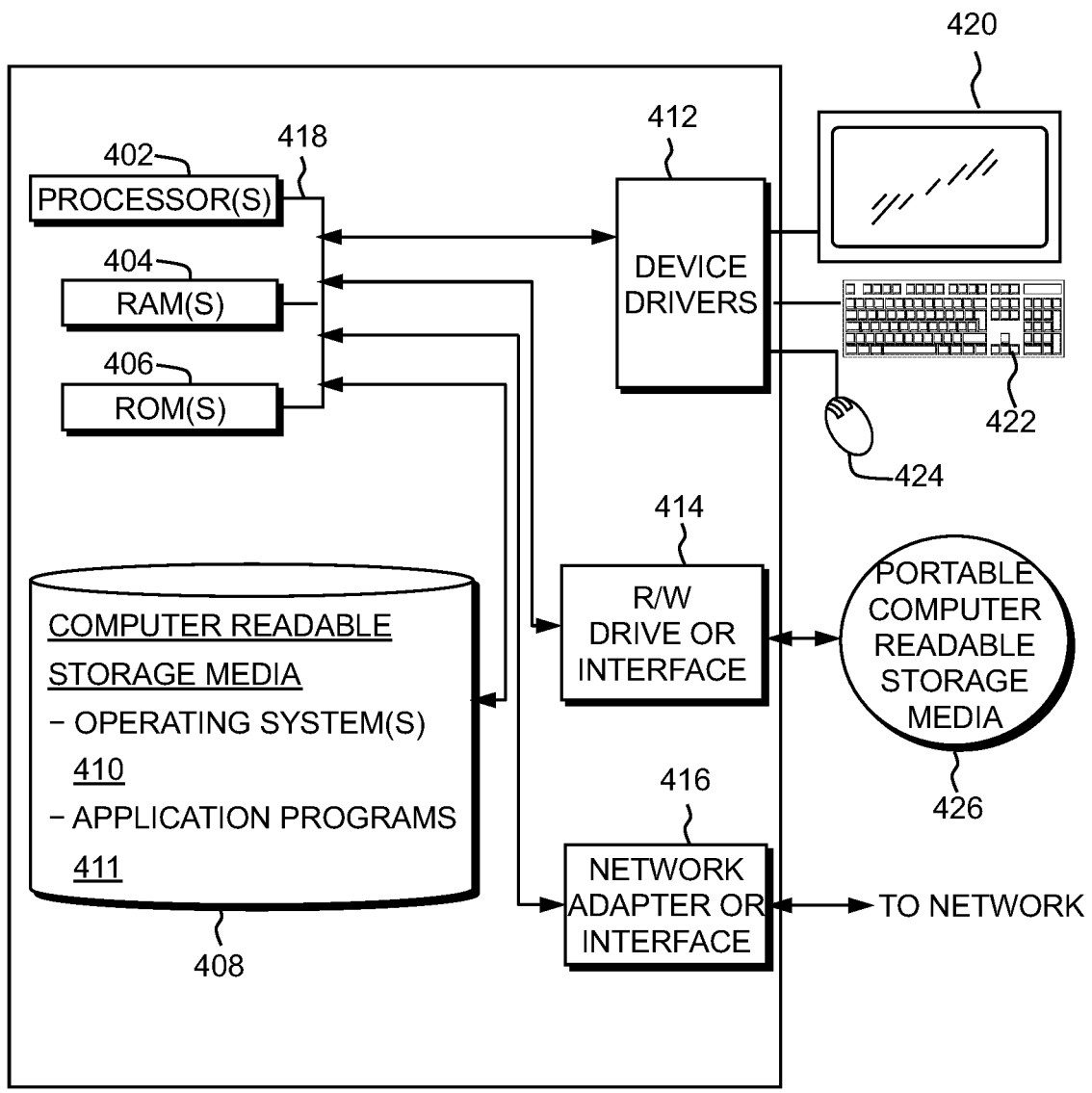
FIG. 4 is a block diagram of an embodiment of a computer system or cloud server in which the present invention may be implemented.

FIG. 4 depicts a block diagram of components of the computer system 300 of FIG. 3, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computer system 300 can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as the described reclamation component 170, are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computer system 300 can also include a R/W drive or interface 414 to read from and write to one or more portable computer readable storage media 426. Application programs 411 on computer system 300 can be stored on one or more of the portable computer readable storage media 426, read via the respective R/W drive or interface 414 and loaded into the respective computer readable storage media 408.

Computer system 300 can also include a network adapter or interface 416, such as a TCP/IP adapter card or wireless communication adapter. Application programs 411 on computer system 300 can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computer system 300 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
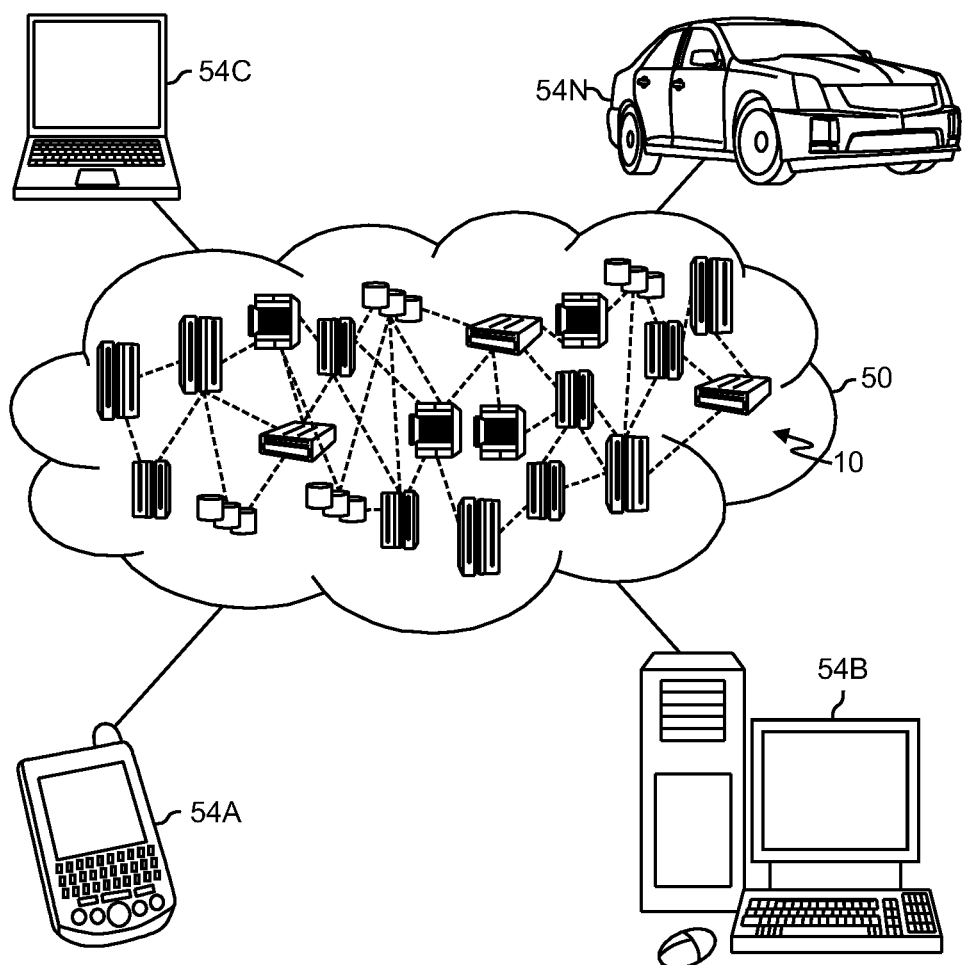
FIG. 5 is a schematic diagram of a cloud computing environment in which the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
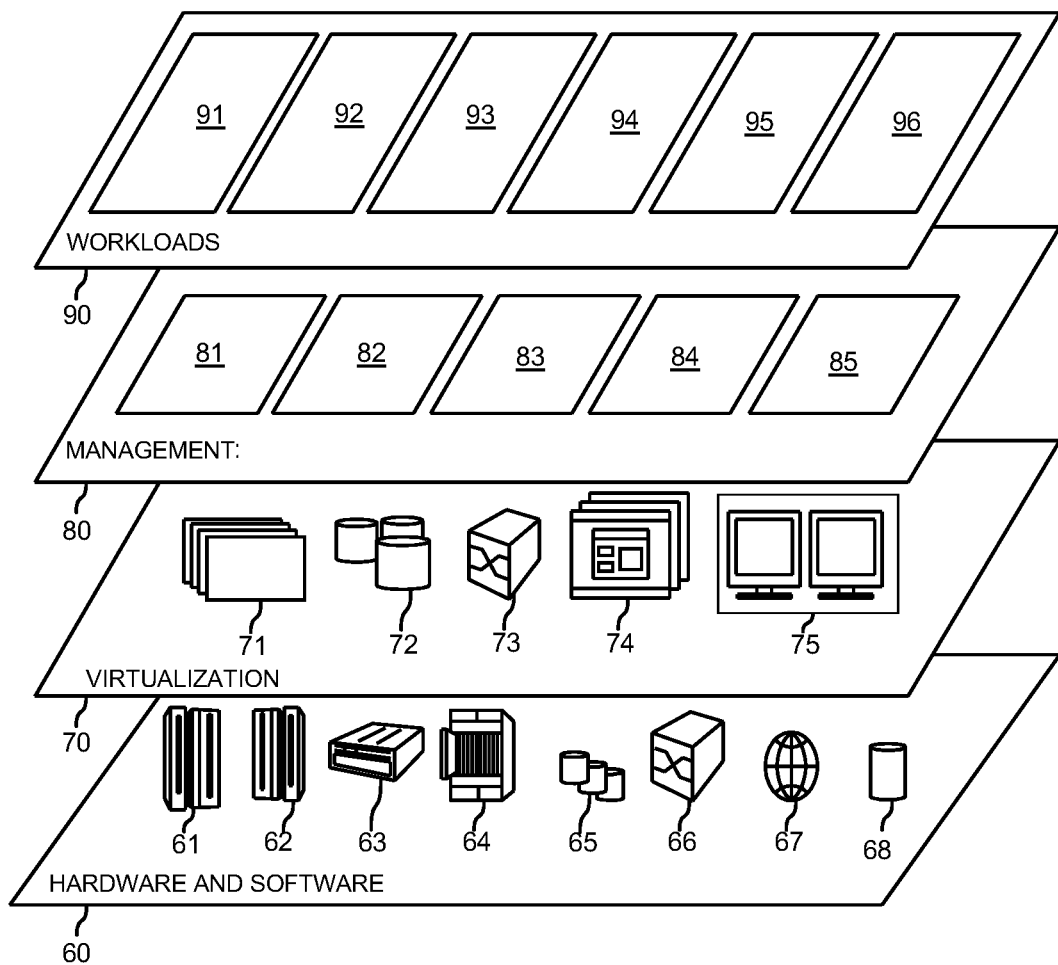
FIG. 6 is a diagram of abstraction model layers of a cloud computing environment in which the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage capacity management processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for managing capacity in a storage system using copy services, comprising:
predicting an imminent event due to a constrained resource of a first copy service relationship of one or more copy service providers;
identifying one or more copy relationship of the one or more copy service providers that will mitigate the imminent event, wherein the identified one or more copy relationship include two or more copy relationship that will balance the partial or full invalidation of the two or more copy relationship to reclaim some of the constrained resource of the first copy service relationship to prevent the imminent event; and
orchestrating a partial or full invalidation of the one or more copy service relationship to reclaim some of the constrained resource of the first copy service relationship to prevent the imminent event.

2. The method as claimed in claim 1, further comprising:
identifying a scale of the invalidation of the one or more copy service relationship required to mitigate the imminent event and applying the scale to the orchestration of the invalidation.

3. The method as claimed in claim 1, wherein an invalidation of the one or more copy service relationship is a desynchronization of a part or all of the one or more copy service relationship by the one or more copy service provider.

4. The method as claimed in claim 1, further comprising:
monitoring the one or more copy service providers including permissions and/or prioritizations for invalidation of their copy service relationships.

5. The method as claimed in claim 1, further comprising monitoring shared resources and their consumption by the one or more copy service providers for their copy service relationships.

6. The method as claimed in claim 1, wherein the one or more copy service relationship relates to a specific region of a data copy or to multiple data copies.

7. The computer-implemented method of claim 1, wherein the identified one or more copy relationship prioritize one or more copy service providers that are already out of synchronization.

8. The computer-implemented method of claim 1, wherein the identified one or more copy relationship are based on a synchronization rate and current synchronization of each copy relationship of the one or more copy relationship.

9. A system for managing capacity in a storage system using copy services, comprising:
a processor and a memory configured to provide computer program instructions to the processor to execute the function of the component:
an event prediction component for predicting an imminent event due to a constrained resource of a first copy service relationship of one or more copy service providers;
a copy service relationship component for identifying one or more copy relationship of the one or more copy service providers that will mitigate the imminent event, wherein the identified one or more copy relationship include two or more copy relationship that will balance the partial or full invalidation of the two or more copy relationship to reclaim some of the constrained resource of the first copy service relationship to prevent the imminent event; and
an invalidation component for orchestrating a partial or full invalidation of the one or more copy service relationship to reclaim some of the constrained resource of the first copy service relationship to prevent the imminent event.

10. The system as claimed in claim 9, including:
a scale identifying component for identifying a scale of the invalidation of the one or more copy service relationship required to mitigate the imminent event and applying the scale to the orchestration of the invalidation.

11. The system as claimed in claim 9, including a copy service monitoring component for monitoring the one or more copy service providers including permissions and/or prioritizations for invalidation of their copy service relationships.

12. The system as claimed in claim 9, including a shared resources monitoring component for monitoring shared resources and their consumption by the one or more copy service providers for their copy service relationships.

13. The system as claimed in claim 9, wherein the invalidation component instructs desynchronizing of a copy service relationship for selected addresses by the one or more copy service providers.

14. The system as claimed in claim 9, including a copy service provider having a desynchronizing component for desynchronizing selected addresses of the one or more copy service providers.

15. The system as claimed in claim 14, including one or more copy service providers having a resynchronizing component for resynchronizing the selected addresses of the copy service.

16. The computer system of claim 9, wherein the identified one or more copy relationship prioritize one or more copy service providers that are already out of synchronization.

17. The computer system of claim 9, wherein the identified one or more copy relationship are based on a synchronization rate and current synchronization of each copy relationship of the one or more copy relationship.

18. A computer program product for managing capacity in a storage system using copy services, the computer program product comprising a computer readable storage medium having program instructions embodied therewith, the program instructions executable by a processor to cause the processor to:
predict an imminent event due to a constrained resource of a first copy service relationship of one or more copy service providers;
identify one or more copy relationship of the one or more copy service providers that will mitigate the imminent event, wherein the identified one or more copy relationship include two or more copy relationship that will balance the partial or full invalidation of the two or more copy relationship to reclaim some of the constrained resource of the first copy service relationship to prevent the imminent event; and
orchestrate a partial or full invalidation of the one or more copy service relationship to reclaim some of the constrained resource of the first copy service relationship to prevent the imminent event.

\* \* \* \* \*